United States Patent [19]

Tschanz et al.

[11] 4,271,700
[45] Jun. 9, 1981

[54] PITOT TUBE ASSEMBLY

[75] Inventors: August E. Tschanz, Lansdale; Robert W. Geiger, Geigertown, both of Pa.

[73] Assignee: Teleflex Incorporated, Limerick, Pa.

[21] Appl. No.: 124,876

[22] Filed: Feb. 26, 1980

[51] Int. Cl.³ .............................................. G01C 21/10
[52] U.S. Cl. .................................... 73/182; 73/861.65
[58] Field of Search .......... 73/861.65, 861.66, 861.67, 73/182, 183

[56] References Cited

U.S. PATENT DOCUMENTS

| 3,217,535 | 11/1965 | Taylor et al. | 73/182 |
| 4,070,909 | 1/1978 | Carpenter | 73/182 |

FOREIGN PATENT DOCUMENTS

| 639035 | 3/1962 | Canada | 73/182 |

*Primary Examiner*—Donald O. Woodiel
*Attorney, Agent, or Firm*—McGlynn and Milton

[57] ABSTRACT

A pitot tube assembly for actuating a marine speedometer including an elongated blade member with the pitot tube passage therein and rotatably supported by an integral plastic bracket. The plastic bracket has two spaced support arms with a pin extending therebetween for rotatably supporting the blade member. A pair of spaced slots extend through the bracket between the two support arms to define an integral resilient spring section which is engaged by a cam surface on the blade member. The cam surface on the blade member includes a first flat portion which engages the resilient section to maintain the blade member in the down position and a second portion extending from an apex at the juncture with the first flat portion at an angle so that, when the apex engages the resilient section and passes over center, the second flat portion would engage the resilient section to maintain the blade member in the raised position.

13 Claims, 6 Drawing Figures

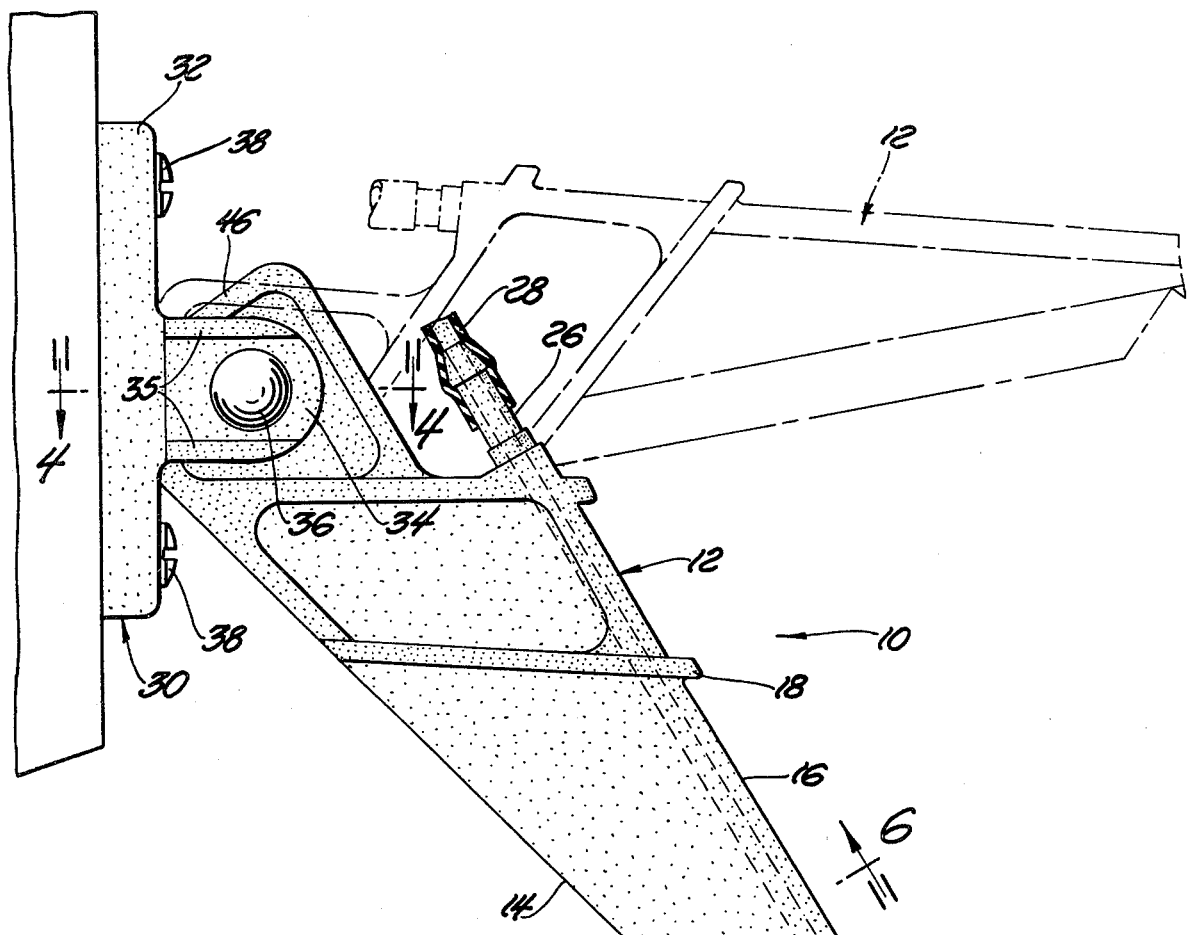
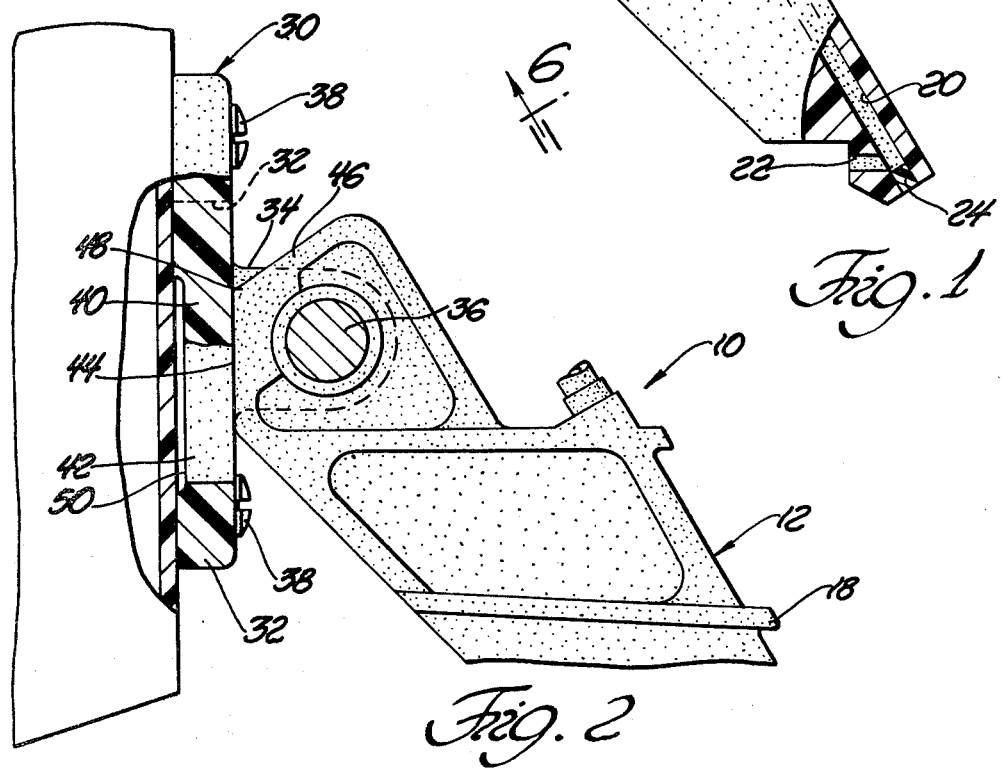

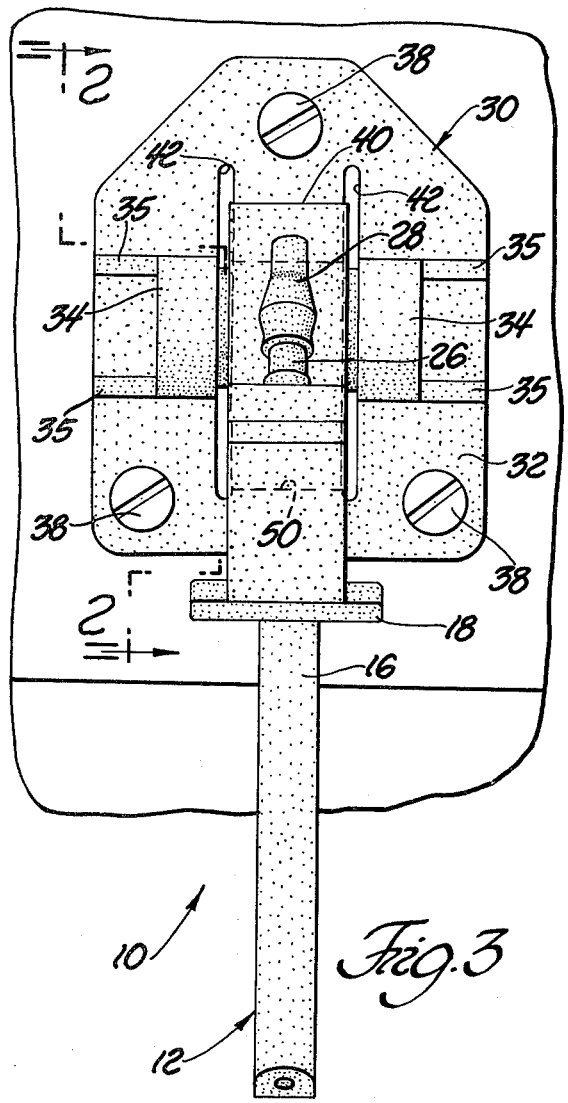
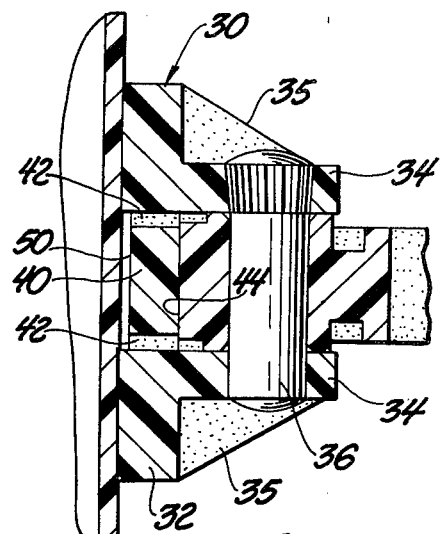
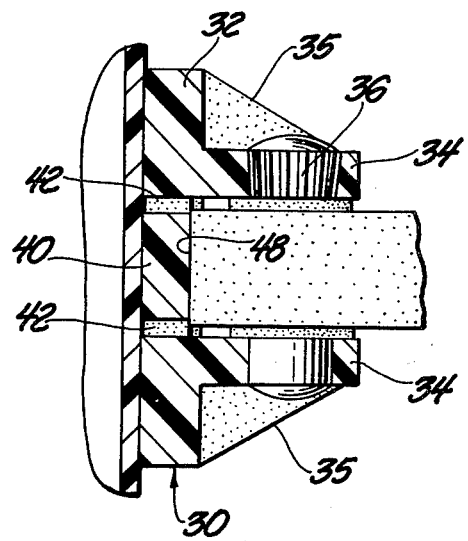
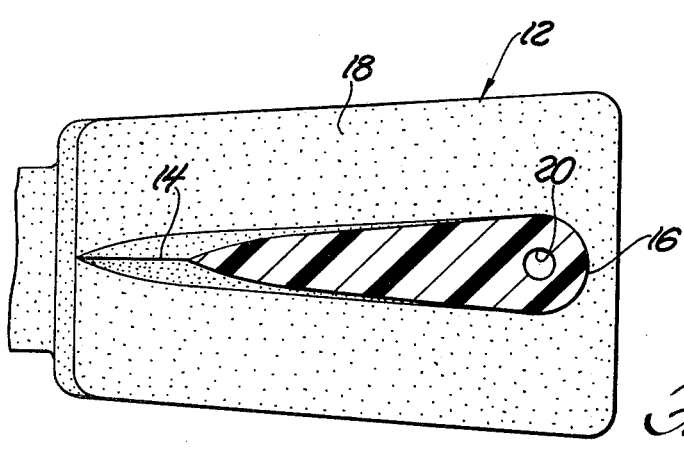

PITOT TUBE ASSEMBLY

BACKGROUND OF THE INVENTION (1) Field of the Invention

This invention relates to a pitot tube assembly for actuating a marine speedometer.

Such assemblies normally include a streamlined body or blade member with a pressure-transmitting passage extending through the blade member from a sensing orifice at the lower end with a tube attached to the passage at the upper end of the blade member for transmitting the pressure to the speedometer.

(2) Description of the Prior Art

Pitot tube assemblies of the type to which the subject invention relates also incorporate a bracket for rotatably supporting the blade member so that the blade member will normally be maintained in a downward operative position but may be rotated to a raised position. The bracket is normally mounted on the rear transom of a boat with the blade extending downwardly below the boat. It frequently occurs that the blade will engage an obstacle while moving through the water and therefore must be allowed to rotate upwardly out of the way of the obstacle to prevent damage to the pitot tube assembly. It is also desirable to rotate the blade member of the pitot tube assembly to the raised position when beaching the boat or transporting a boat on a trailer.

Accordingly, there have been pitot tube assemblies developed utilizing separate metal spring assemblies of various structures to urge the blade assembly to the down position but against which the blade may act in rotating to a raised position. Such assemblies have the disadvantage of including numerous parts and the metal components are subject to corrosion and rust.

SUMMARY OF THE INVENTION

In accordance with the subject invention, there is provided a pitot tube assembly for actuating a marine speedometer. The assembly includes an elongated blade member having a leading edge and upper and lower ends. A passage extends between the upper and lower ends of the blade member with a portion of the passage opening forwardly toward the leading edge. A support bracket means rotatably supports the blade member for impacting water in a normal down position while allowing the blade member to rotate to a raised position in response to a predetermined force applied against the leading edge of the blade member. The support bracket means includes an integral resilient section and the blade member includes a cam surface engaging the resilient section so that upward rotation of the blade member from the down position toward the raised position moves the cam surface into the resilient section to move the resilient section as the resilient section resists the upward rotation and urges the blade member toward the down position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational view showing the pitot tube assembly of the subject invention attached to the rear of a boat with the blade member shown in the down operative position in full lines and in the raised position in phantom;

FIG. 2 is a fragmentary cross-sectional view similar to FIG. 1 and taken substantially along line 2—2 of FIG. 3;

FIG. 3 is a rear view of the assembly;

FIG. 4 is a cross-sectional view taken substantially along line 4—4 of FIG. 1;

FIG. 5 is a view similar to FIG. 4 but showing the blade member in a position intermediate the down and raised position shown in FIG. 1; and FIG. 6 is a cross-sectional view taken substantially along line 6—6 of FIG. 1.

DESCRIPTION OF THE PREFERRED EMBODIMENT

A pitot tube assembly for actuating a marine speedometer and constructed in accordance with the instant invention is generally shown at 10.

The assembly includes an elongated blade member generally indicated at 12. The blade member has a knife-like or sharp leading edge 14 and a round trailing edge 16. The edges 14 and 16 extend upwardly from the bottom of the blade member 12 to a horizontal fin 18 above which the blade member 12 comprises molded structure, the blade member 12 being preferably molded of a plastic material. The blade member 12 has a passage 20 extending between the upper and lower ends with a portion 22 opening forwardly toward the leading edge 14. A plug 24 is inserted into the lower end of the passage 20 for closing same. The blade member 12 has a tube connection 26 at the upper end and extending from the passage 20. As is well known in the art, a tube 28 is disposed over the tube connection 28 for transmitting pressure from the orifice 22 through the passage 20 and to a speedometer mechanism.

The assembly 10 also includes a support bracket means generally indicated at 30 rotatably supporting the blade member 12 so that the blade member 12 may impact water in the normal down position shown in full lines in FIG. 1 while allowing the blade member 12 to rotate to the raised position shown in phanton in FIG. 1 in response to a predetermined force applied against the leading edge 14 of the blade member 12. The support bracket means 30 comprises an integral plastic bracket having a base 32 and a pair of spaced support arms 34 extending from the base 32. Reinforcing ribs 35 extend from the sides of the arms 34 for providing lateral support to the arms 34. Also included in the support bracket means is a support pin 36 extending between the support arms 34 and through the upper end of the blade member 12, the upper end of the blade member 12 being disposed between the support arms 34. The pin 36 has an enlarged head at one end which is forced into the opening in one of the arms 34 whereby the pin 36 is retained in place by a force fit. It will be appreciated, however, that the pin 36 may be held in place in various ways. The base portion 32 of the bracket is plate-like in configuration and has holes therethrough for receiving the fasteners 38 which secure the assembly to a boat structure.

The support bracket means 30 includes an integral resilient section 40 and the blade member 12 includes a cam surface engaging the resilient section 40 so that upward rotation of the blade member 12 from the down position toward the raised position moves the cam surface of the blade member into the resilient section to move the resilient section 40 as the resilient section 40 resists such upward rotation and urges the blade member 12 toward the down position. More specifically, the resilient section 40 is defined by the section of the base 32 which is located between the support arms 34 and is defined by a pair of parallel slots 42 extending through the base 32 in parallel relationship to and between the support arms 34. Thus, the resilient section 40 will bow rearwardly in response to upward rotation of the blade member 12.

The cam surface of the blade member 12 is disposed between the support arms 34 and includes a first flat portion 44 which normally engages the resilient section 40 to maintain the blade member 12 in the down position, as best illustrated in FIG. 2. In other words, the first flat portion 44 of the cam surface of the blade member 12 is flat and is in flat engagement with the resilient section 40 when the blade member 12 is in the down position. The cam surface of the blade member 12 also includes a second flat portion 46 joining the upper extremity of the first flat portion 44 at an apex 48 as shown in FIGS. 2 and 5. The second flat portion 46 extends away from the apex 48 and the first flat portion 44 at an angle relative to the first flat portion 44. In other words, the flat portions 44 and 46 have an included angle of less than 180°. Accordingly, the apex 48 moves the resilient section 40 in a bowed fashion rearwardly during upward movement of the blade member 12 until the apex 48 rotates over center relative to the pin 36 and the resilient section 40 whereupon the second flat portion 46 is in flat engagement with the resilient section 40 to maintain the blade member 12 in the raised position as illustrated in phantom in FIG. 1. In other words, the apex 48 rotates about the axis of the pin 36 and moves over center when it engages the resilient section 40 below a plane which passes through the axis of the pin 36 and which is perpendicular to the resilient section 40. As illustrated in FIG. 5, the apex 48 has bowed the resilient section 40 rearwardly and is at the over center position.

The base 32 has a top from which the support arms 34 extend and a bottom which engages the boat. The bottom has a recess 50 between the slots 42 to define a thinner section than the remainder of the base 32. However, the recess 50 extends only a portion of the length of the slots 42. Specifically, the recess 50 extends from a position adjacent the bottom ends of the slots 42 a distance equivalent to the length of the first flat portion 44 and slightly beyond the apex 48 when the blade member 12 is in the down position, as illustrated in FIG. 2, i.e., the slots 42 extend upwardly farther beyond the apex 48 than the recess 50.

As will be appreciated, the blade member 12 is normally in the positions illustrated in solid lines in FIGS. 1 and 2 with the first flat surface 44 being in flat engagement with the resilient section 40. Should, however, the blade member 12 hit an obstacle or it is wished to move the blade member manually to the raised position, it is rotated upwardly and that rotation is resisted by the apex 48 moving against the resilient section 40. Should the force be of sufficient magnitude, however, the blade member 12 will rotate completely to the raised position illustrated in phantom as the apex 48 moves over center and the blade member 12 snaps into the raised position as the second flat surface 46 engages the resilient section 40. The depth of the recess 50 and, consequently, the thickness of the resilient section 40, determines the amount of resistance to rotational movement of the blade member 12. The blade member 12 and the support bracket means 30 are each integral plastic members which may be molded and secured together by the pin 36 thereby requiring a minimum of components.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A pitot tube assembly for actuating a marine speedometer, comprising; an elongated blade member having a leading edge and upper and lower ends, said blade member having a passage extending between said upper and lower ends with a portion opening forwardly toward said leading edge, support bracket means rotatably supporting said blade member for impacting water in the normal down position while allowing said blade member to rotate to a raised position in response to a predetermined force applied against said leading edge thereof, said support bracket means including an integral resilient section and said blade member includes a cam surface engaging said resilient section so that upward rotation of said blade member from said down position toward said raised position moves said cam surface into said resilient section to move the resilient section as the resilient section resists such upward rotation and urges said blade member toward said down position.

2. An assembly as set forth in claim 1 wherein said support bracket means comprises an integral plastic bracket and a support pin rotatably supporting said blade member, said blade member being made of plastic.

3. An assembly as set forth in claim 2 wherein said bracket includes a base and a pair of spaced support arms extending from said base, said upper end of said blade member being disposed between said support arms, said support pin extending between said support arms and through said upper end of said blade member.

4. An assembly as set forth in claim 3 wherein said resilient section is defined by the section of said base of said bracket located between said support arms.

5. An assembly as set forth in claim 4 wherein said cam surface of said blade member is disposed between said support arms.

6. An assembly as set forth in claim 5 wherein said resilient section is defined by a pair of parallel slots extending through said base in parallel relationship to and between said support arms so that the resilient section will bow in response to upward rotation of said blade member.

7. An assembly as set forth in claim 6 wherein said cam surface includes a first flat portion normally engaging said resilient section to maintain said blade member in said down position.

8. An assembly as set forth in claim 7 wherein said cam surface includes a second flat portion joining the upper extremity of said first flat portion at an apex and extending away from said apex and said first flat portion at an angle relative thereto so that said apex moves said resilient section during said upward movement until said apex rotates over center relative to said pin and said resilient section and said second flat portion engages said resilient section to maintain said blade member in said raised position.

9. An assembly as set forth in claim 8 wherein said resilient section is thinner than the remainder of said base.

10. An assembly as set forth in claim 9 wherein said base has a top from which said support arms extend and a bottom, said bottom having a recess between said slots to define the thinner resilient section.

11. An assembly as set forth in claim 10 wherein said recess extends only a portion of the length of said slots.

12. An assembly as set forth in claim 11 wherein said recess extends the length of said first portion of said cam surface and beyond said apex when said blade member is in said down position.

13. An assembly as set forth in claim 12 wherein said slots extend farther beyond said apex than said recess.

* * * * *